(12) United States Patent
Ofek et al.

(10) Patent No.: US 7,155,120 B1
(45) Date of Patent: Dec. 26, 2006

(54) LINK LEVEL NETWORK PROTECTION PATH CALCULATION MECHANISM FOR USE IN OPTICAL NETWORKS

(75) Inventors: Ronen Ofek, Hod Hasharon (IL); Lior Shabtay, Ramat Gan (IL)

(73) Assignee: Atrica Israel Ltd., Herzelia (IL)

( * ) Notice: Subject to any disclaimer, the term of this patent is extended or adjusted under 35 U.S.C. 154(b) by 960 days.

(21) Appl. No.: 09/918,277

(22) Filed: Jul. 30, 2001

(51) Int. Cl.
*G02F 1/00* (2006.01)

(52) U.S. Cl. .............. 398/7; 398/1; 398/2; 398/3; 398/4; 398/5; 398/17; 398/20; 398/45; 398/48; 398/50; 398/59; 398/82; 398/83; 398/79; 370/216; 370/217; 370/218; 370/225; 714/1; 714/2; 714/4; 714/25

(58) Field of Classification Search .............. 398/3, 398/4, 5, 1, 2, 7, 17, 20, 45, 48, 50, 59, 82, 398/83, 79; 370/216, 218, 225, 217; 714/1, 714/2, 4, 25
See application file for complete search history.

(56) References Cited

U.S. PATENT DOCUMENTS

| | | | |
|---|---|---|---|
| 5,093,824 A * | 3/1992 | Coan et al. ............ | 370/228 |
| 5,982,517 A | 11/1999 | Fishman ............... | 359/119 |
| 6,198,721 B1 * | 3/2001 | Mueller ................ | 370/223 |
| 6,256,291 B1 | 7/2001 | Araki ................... | 370/216 |
| 6,324,162 B1 * | 11/2001 | Chaudhuri ............ | 370/225 |
| 6,430,150 B1 * | 8/2002 | Azuma et al. ........ | 370/218 |
| 2002/0089712 A1 * | 7/2002 | Kang et al. .......... | 359/110 |

OTHER PUBLICATIONS

Internet Engineering Task Force Draft, "draft-gan-fast-reroute-00.txt," "A Method for MPLS LSP Fast-ReRoute Using RSVP Detours", Apr. 2001.

Internet Engineering Task Force Draft, "draft-chang-mpls-rsvp-path-protection-ext-01.text," "Extensions to RSVP-TE for MPLS Path Protection", Nov. 2000.

Internet Engineering Task Force Draft, "draft-swallow-rsvp-bypass-label-01.txt," "RSVP Label Allocation for Backup Tunnels", Nov. 2000.

Internet Engineering Task Force Draft, "draft-iwata-mpls-shared-fastreroute-00.txt," "MPLS Signaling Extensions for Shared Fast Rerouting", Jul. 2001.

Internet Engineering Task Force Draft, "draft-kini-restoration-shared-backup-01.txt," "Shared Backup Label Switched Path Restoration", May. 2001.

Internet Engineering Task Force Draft,"draft-kini-isis-lsp-restoration-00.txt," "Intermediate System to Intermediate System (IS-IS) Protocol Extensions for Label Switched Path Restoration", Nov. 2000.

(Continued)

*Primary Examiner*—Hanh Phan
(74) *Attorney, Agent, or Firm*—Zaretsky & Associates PC; Howard Zaretsky

(57) ABSTRACT

A link based network protection path calculation mechanism wherein a protection route is calculated that is guaranteed not to traverse the link it is intended to protect. The mechanism takes advantage of the fact that the same color cannot pass twice through the same optical fiber. The protection path is determined by eliminating all colors from the logical topology of the network except for the color corresponding to the link to be protected before executing the search algorithm. This serves to guarantee that the protection path calculated will not traverse the same physical fiber as the link to be protected. Virtual colors can be assigned to the links running through fiber bundles such that they do not pass through the same fiber/bundle twice.

43 Claims, 6 Drawing Sheets

OTHER PUBLICATIONS

Internet Engineering Task Force Draft, "draft-kini-ospf-lsp-restoration-00txt," "Open Shortest Path First (OSPF) Protocol Extensions for Label Switched Path Restoration", Nov. 2000.
Internet Engineering Task Force Draft, "draft-ietf-mpls-recovery-frmwrk-02.text," "Framework for MPLS-Based Recovery", Mar. 2001.
Internet Engineering Task Force Draft, "draft-chang-mpls-path-protection-02.txt," "A Path Protection/Restoration Mechanism for MPLS Networks", Nov. 2000.
Internet Engineering Task Force Draft, "draft-katz-yeung-ospf-traffice-03.txt," "Traffic Engineering Extensions to OSPF", Sep. 2000.
Internet Engineering Task Force Draft, "draft-haskin-mpls-fast-reroute-05.txt," "A Method for Setting an Alternative Label Switched Paths to Handle Fast Reroute", Nov. 2000.
Suresh Katukam "Handling BLSR with Traffic Engineering" Cisco Systems, Jan. 2001.
Tim Wo Chung; John Coulter; Bell Canada: Jeff Fitchett; Stentor Canadian Network Management: Sam Mokbel; Onet Networking Inc.: Bill St. Arnaud; CANARIE Inc.: Sep. 22, 1998 "Architectural and Engineering Issues for Building an Optical Internet".

* cited by examiner

LINK LEVEL NETWORK PROTECTION PATH CALCULATION MECHANISM FOR USE IN OPTICAL NETWORKS

FIELD OF THE INVENTION

The present invention relates generally to data communications and more particularly relates to a link level network protection path calculation mechanism for use in optical fiber based networks.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

It is common for many networks to provide some form of protection in the event of failure. For example, in the event of a link or node failure, the network can be adapted to switch data traffic around the failed element via a protection route.

A network diagram illustrating restoration in an example prior art optical network is shown in FIG. 1. The example network, generally referenced 10, comprises a plurality of nodes 14, labeled 1 through 6, end stations 12, labeled A and B and Network Management System (NMS) 24. The nodes are connected to each other via physical links 22. A path is established between end stations A and B via nodes 1, 2, 3 and 4 as represented by the dashed line 16.

In the event of a failure (e.g., fiber cut) in link 20, it is desirable to be able to switch traffic as quickly as possible to an alternate route. In this case, the alternate route for the connection between nodes 2 and 3 comprises the path that runs around the ring in the opposite direction connecting nodes 2 and 3, represented by dotted line 18. A disadvantage of this approach, however, is that the alternate path must traverse the entire ring just to bypass a failed link.

Link protection in a Wave Division Multiplexing (WDM) or Dense WDM (DWDM) optical network can be achieved by calculating and configuring a restoration path (which is the alternate route for that link) using logical links. Each physical fiber comprises many wavelengths (i.e. colors) of light wherein each color is used in a different logical link. The restoration path route calculation for the failure of any given link can be performed using the available logical links.

A disadvantage of this approach, however, is that the alternate route calculated to bypass the failed link may include a logical link that runs over the physical fiber link that failed, rendering the alternate route unusable. Search algorithms typically only have a logical view of the network since the physical network is difficult to determine. Thus, the search algorithms are not aware of the physical fiber connectivity in WDM networks. The search algorithm therefore may route the path over logical links that pass through the failed physical fiber. In the event of a fiber cut, the backup path cannot be used. This occurs because the entity calculating the protection route (restoration route) only sees the logical links (i.e. other wavelengths) as alternative routes that can be used in the event of a fiber cut. This, however, is problematic if the backup path traverses the same physical link as the link to be backed up.

Thus, there is a need for a link protection path setting mechanism for use in optical networks that is capable of calculating network protection paths for links that do not traverse same physical fiber link as the link to be backed up.

SUMMARY OF THE INVENTION

The present invention provides a link based network protection path calculation mechanism. The mechanism is particularly useful in optical networks employing wave division multiplexing or dense wave division multiplexing but is also applicable to other types of optical networks as well. In addition, the invention is applicable to any network topology such as mesh or ring network topologies. Further, the invention is not limited to the type of signaling used or the routing algorithm used to calculate the protection routes.

In one embodiment, the mechanism of the present invention can be implemented in a Network Management System in communication with the network or alternatively, may be implemented in the nodes themselves.

The mechanism of the present invention is applicable in conjunction with a link level protection switching mechanism whereby physical links and nodes are protected against failure. Using the mechanism of the present invention, the link protection mechanism may be capable of achieving sub 50 millisecond hardware based restoration times, depending on the implementation. Software re-routing subsequent to the hardware based re-routing takes much longer due to the delays involved with calculating the optimum re-route and provisioning (i.e. configuring) the results in the appropriate network elements.

The protection path setting mechanism of the present invention functions to calculate a protection route that is guaranteed not to traverse the link it is intended to protect. The mechanism takes advantage of the fact that there cannot exist two links having the same color running over the same optical fiber.

In networks with sufficient redundancy within each color (i.e. in each sub-network built of a single color there is sufficient redundancy that a protection path can be found for each link), the mechanism is operative to determine the protection path by eliminating all colors from the logical topology of the network except for the color corresponding to the link to be protected. This guarantees that the protection path calculated will not traverse the same physical fiber as the link to be protected. Thus, the invention does not require or rely on the physical topology of the network. This is useful in WDM networks where the physical topology is typically not known.

For networks that do not have sufficient redundancy within each color and for networks that do have sufficient redundancy within each color but use bundles of optical fiber to connect nodes, the mechanism of the present invention introduces the concept of virtual (i.e. logical) wavelength or color whereby the logical links in use over a particular physical link are assigned unique colors. By default, the color of the logical link is equal to its WDM wavelength. Note the virtual colors assigned may be the original real color or a 'virtual' color that does not actually exist. A characteristic of the network is that within each physical link there is only one instance of any particular color, either real or virtual.

The protection route is precalculated (or dynamically on the fly) using any suitable search algorithm, e.g., Dijkstra, BFS, DFS, etc. and is not critical to the operation of the invention. The logical topology of the network used by the search algorithm is first modified by removing all logical links other than those with the same logical color of the link to be protected. This ensures that the protection route will not pass through the failed physical fiber.

Once the protection routes are calculated, they can be provisioned in the network by configuring the nodes accordingly. The configuration may be accomplished using any suitable signaling protocol such as, CR-LDP or RSVP-TE. The configuration can also be performed by an NMS agent using a management protocol such as SNMP.

The mechanism of the present invention is well suited for implementation using software. In one example application, the mechanism is implemented in software on an NMS connected to the network. The NMS comprises a computer comprising a processor, memory, etc. operative to execute software adapted to perform the link based network protection path calculation mechanism of the present invention.

There is thus provided in accordance with the present invention a method of determining a protection route in a network for links having a wave division multiplexing (WDM) color associated therewith, the method comprising the steps of removing all links having a color other than that of the link to be protected to generate a single color logical topology, removing the link to be protected from the single color logical topology and generating a restoration path for the link to be protected only from the single color logical topology.

There is also provided in accordance with the present invention a method of determining a protection route in a network, the method comprising the steps of assigning a virtual color to the links within the network, removing all links having a virtual color other than that of the link to be protected to generate a single color logical topology, removing the link to be protected from the single color logical topology and generating a restoration path for the link to be protected only from the single color logical topology.

There is further provided in accordance with the present invention a method of determining a protection route in a network for links having a wave division multiplexing (WDM) color associated therewith, the method comprising the steps of assigning a virtual color the links within the network, assigning virtual colors to links within a bundle of optical fibers such that the same virtual color does not appear more than once across all fibers within each bundle of optical fibers, removing all links having a virtual color other than that of the link to be protected to generate a single color logical topology, removing the link to be protected from the single color logical topology and generating a restoration path for the link to be protected only from the single color logical topology.

There is also provided in accordance with the present invention a computer program product for use in a network device, the computer program product comprising a computer useable medium having computer readable program code means embodied in the medium for determining a protection route in a network for links having a wave division multiplexing (WDM) color associated therewith, the computer program product comprising computer readable program code means for removing all links having a color other than that of the link to be protected to generate a single color logical topology, computer readable program code means for removing the link to be protected from the single color logical topology and computer readable program code means for generating a restoration path for the link to be protected only from the single color logical topology.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
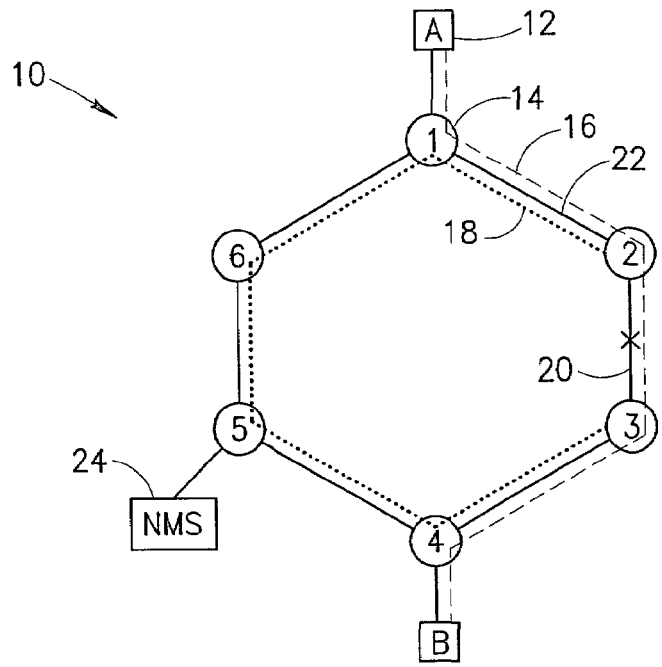
FIG. 1 is a network diagram illustrating restoration in an example prior art optical network.

The following notation is used throughout this document.

| Term | Definition |
| --- | --- |
| ASIC | Application Specific Integrated Circuit |
| BSF | Breadth First Search |
| CD-ROM | Compact Disc-Read Only Memory |
| CPU | Central Processing Unit |
| CR-LDP | Constraint based Label Distribution Protocol |
| DAT | Digital Audio Tape |
| DFS | Depth First Search |
| DSP | Digital Signal Processor |
| DWDM | Dense Wave Division Multiplexing |
| EEPROM | Electrically Erasable Programmable Read Only Memory |
| EEROM | Electrically Erasable Read Only Memory |
| EPROM | Erasable Programmable Read Only Memory |
| FPGA | Field Programmable Gate Array |
| LAN | Local Area Network |
| LSP | Label Switched Path |
| MAN | Metropolitan Area Network |
| MPLS | Multi-Protocol Label Switching |
| NIC | Network Interface Card |
| NMS | Network Management System |
| OADM | Optical Add Drop Multiplexer |
| OSPF | Open Shortest Path First |
| RAM | Random Access Memory |
| ROM | Read Only Memory |
| RSVP-TE | Reservation Protocol with Traffic Engineering Extensions |
| SNMP | Simple Network Management Protocol |
| SONET | Synchronous Optical Network |
| VPN | Virtual Private Network |
| WAN | Wide Area Network |
| WDM | Wave Division Multiplexing |

Definitions Used Throughout

The following terms and definitions apply throughout this document.

Physical link is defined as the actual optical fiber connecting one node to another. A physical link is always connected only between two nodes.

Logical link in a WDM or DWDM environment is defined as the electrically terminated link created between two nodes by assignment of a specific color. A logical link can span any number of physical links. In WDM or DWDM networks, different colors are used to establish logical links.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established.

Protection bandwidth is defined as bandwidth on a link reserved for protection purposes, e.g., protection tunnels, bypass tunnels, recovery path, detour paths and protection paths.

The term sufficient redundancy within each color refers to there being in each sub-network built of a single color sufficient alternate paths such that a protection path can be found for each link.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The terms primary path and active path are synonyms for a working path.

The recovery path is the path by which traffic is restored after the occurrence of a fault. In other words, the path on which the traffic is directed by the recovery mechanism. The recovery path may be established by MPLS means. The terms back-up path, alternative path and protection path are synonyms for a recovery path. The terms path and route are synonymous.

The protection counterpart is the 'other' path when discussing pre-planned protection switching schemes. The protection counterpart for the working path is the recovery path and vice-versa.

A path group (PG) is a logical bundling of multiple working paths, each of which is routed identically between a Path Switch LSR and a Path Merge LSR. A protected path group (PPG) is a path group that requires protection. A protected traffic portion (PTP) is the portion of the traffic on an individual path that requires protection.

The path switch LSR (PSL) is an LSR responsible for switching or replicating the traffic between the working path and the recovery path. The path merge LSR (PML) is an LSR that receives both working path traffic and its corresponding recovery path traffic, and either merges their traffic into a single outgoing path, or, if it is itself the destination, passes the traffic on to the higher layer protocols.

An intermediate LSR is an LSR on a working or recovery path that is neither a PSL nor a PML for that path. A bypass tunnel is a path that serves to back up a set of working paths using the label stacking approach in MPLS. The working paths and the bypass tunnel must all share the same path switch LSR (PSL) and the path merge LSR (PML).

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

Revertive mode refers to a recovery mode in which traffic is automatically switched back from the recovery path to the original working path upon the restoration of the working path to a fault-free condition. This assumes a failed working path does not automatically surrender resources to the network. Non-revertive mode refers to a recovery mode in which traffic is not automatically switched back to the original working path after this path is restored to a fault-condition. Note that depending on the configuration, the original working path may, upon moving to a fault-free condition, become the recovery path, or it may be used for new working traffic, and be no longer associated with its original recovery path.

MPLS protection domain refers to the set of LSRs over which a working path and its corresponding recovery path are routed. MPLS protection plan refers to the set of all LSP protection paths and the mapping from working to protection paths deployed in an MPLS protection domain at a given time.

A liveness or keep alive message is a message exchanged periodically between two adjacent LSRs that serve as a link probing mechanism. It provides an integrity check of the forward and the backward directions of the link between the two LSRs as well as a check of neighbor aliveness. A path continuity test is a test that verifies the integrity and continuity of a path or path segment.

A path failure (PF) is a fault detected by MPLS-based recovery mechanisms, which is defined as the failure of the keep alive message test or a path continuity test, which indicates that path connectivity is lost. Path degraded is a fault detected by MPLS-based recovery mechanisms that indicates that the quality of the path is unacceptable. A link failure (LF) is a lower layer fault indicating that link continuity is lost. This may be communicated to the MPLS-based recovery mechanisms by the lower layer. Link degraded (LD) is a lower layer indication to MPLS-based recovery mechanisms that the link is performing below an acceptable level.

A fault indication signal (FIS) is a signal that indicates that a fault along a path has occurred. It is relayed by each intermediate LSR to its upstream or downstream neighbor, until it reaches an LSR that is setup to perform MPLS recovery. The FIS is transmitted periodically by the node/nodes closest to the point of failure, for some configurable length of time.

A fault recovery signal (FRS) is a signal that indicates a fault along a working path has been repaired. Again, like the FIS, it is relayed by each intermediate LSR to its upstream or downstream neighbor, until is reaches the LSR that performs recovery of the original path. The FRS is transmitted periodically by the node/nodes closest to the point of failure, for some configurable length of time.

The term MPLS-based recovery refers to the ability to quickly and completely restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

DETAILED DESCRIPTION OF THE INVENTION

The present invention provides a link based network protection route calculation mechanism. The mechanism is particularly useful in optical networks employing wave division multiplexing or dense wave division multiplexing but is also applicable to other types of networks as well. In addition, the invention is applicable to networks having any topology such as mesh or ring network topologies. Further, the invention is not limited to the type of signaling used or the routing algorithm used to calculate the protection routes.

For illustration purposes, the principles of the present invention are described in the context of an optical network employing WDM techniques. Further, the mechanism of the present invention is shown implemented in a Network Management System in communication with the network. It is not intended, however, that the invention be limited to the configurations and embodiments described herein. It is appreciated that one skilled in the electrical and/or networking arts may apply the principles of the present invention to numerous other types of networking devices and network configurations as well without departing from the spirit and scope of the invention.

Two embodiments of the invention are presented. In the first embodiment, no virtual colors are assigned and the actual existing colors are used. This embodiment is applicable in single fiber networks using pure WDM or DWDM that have sufficient redundancy within each color to create protection paths. In the second embodiment, virtual colors are assigned. This embodiment is applicable in either networks employing optical fiber bundles or in networks that do not initially have sufficient redundancy within each color to create protection paths.

First Embodiment-Natural WDM Colors

Figure 2:
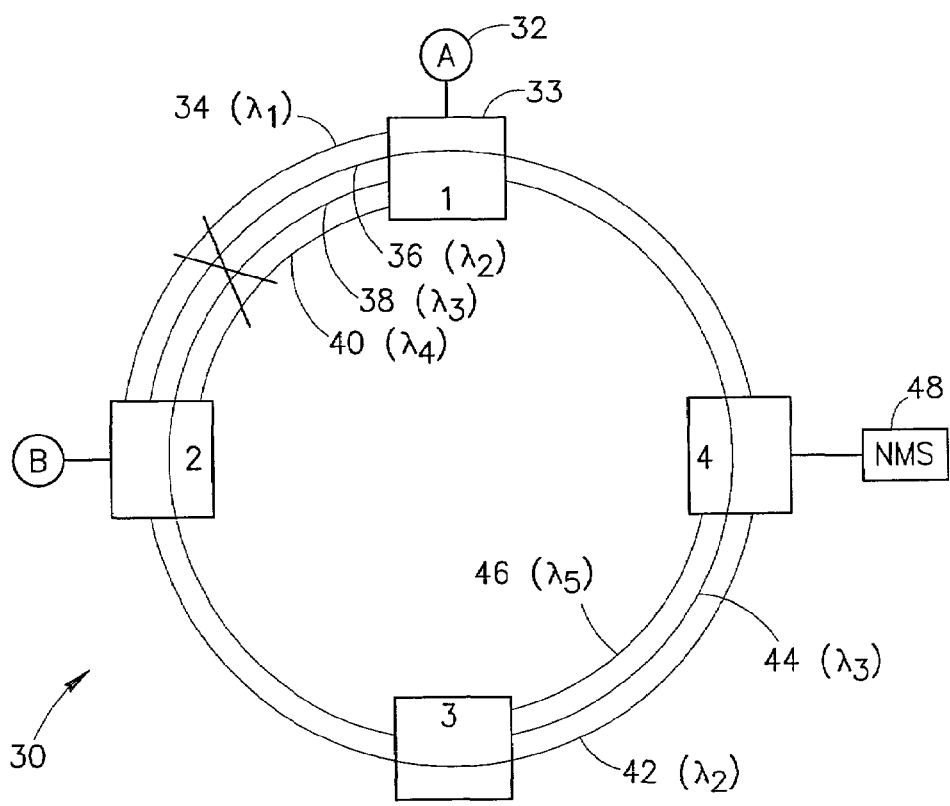
FIG. 2 is a network diagram illustrating an example restoration scenario in a ring optical network employing wavelength division multiplexing.

The first embodiment is described with reference to a network diagram illustrating an example restoration scenario in a ring optical network employing wavelength division multiplexing as shown in FIG. 2. The network, generally referenced 30, comprises a plurality of nodes 33, labeled 1 through 4, end stations 32, labeled A and B and Network Management System (NMS) 48. The nodes are connected to each other via physical fiber links (not explicitly shown).

The physical links in the network comprise optical fiber using WDM or DWDM wherein multiple colors share the same fiber. Thus, each physical link may comprise a plurality of logical links, each associated with a different color. The use of WDM enables a number of logical links to be established between various nodes in the network. Each logical link may traverse multiple physical links. Each node comprises an Optical Add Drop Multiplexer (OADM) or any other WDM or DWDM devices adapted to add and drop zero or more colors or to pass zero or more colors through without adding or dropping them.

In the example network shown, seven logical links are established using various colors. In particular, link 34 between nodes 1 and 2 using $\lambda_1$, link 36 between nodes 2 and 4 using $\lambda_2$, link 38 between nodes 1 and 3 using $\lambda_3$, link 40 between nodes 1 and 2 using $\lambda_4$, link 42 between nodes 2 and 4 using $\lambda_2$, link 44 between nodes 1 and 3 using $\lambda_3$ and link 46 between nodes 3 and 4 using $\lambda_5$.

The mechanism of the present invention is operative to calculate protection routes for the links in the network. Once the protection routes are calculated and provisioned, any well known traffic restoration mechanism can be used in the event of a failure (e.g., fiber cut) to quickly switch traffic from the failed link to the protection route.

The path reroute mechanism is adapted to calculate a route that does not traverse the same physical link carrying the logical link to be protected. In this case, the protection route for logical-links running over the fiber between nodes 2 and 4 may comprise any path that is capable of transporting traffic from node 2 to node 4 that is made up of existing links. For example, assume a protection route for link 36 is to be calculated. In accordance with the route calculation mechanism, link 42 is selected as the route to protect link 36 since it is the same color as link 36 and connects nodes 2 and 4. Thus, in the mechanism of the invention, color protects color.

Note that without the benefit of the mechanism of the present invention, the search algorithm may have selected a protection route comprising links 40, 38 and 46 as they function to connect nodes 2 and 4. The problem with this protection route, however, is that in the event that the fiber between nodes 1 and 2 is cut, links 40 and 38 are also cut thus rendering this path useless as a protection path.

Note also that the links may comprise any combination of PHY links such as 10 Gbps Ethernet, SONET, ATM, etc. In addition, links in the network can share the same fiber using WDM or DWDM multiplexing.

Initially, in the event of a link failure such as an optical fiber cut, etc., the software in each node does not get involved. At first, the hardware detects a loss of signal on the link and the network processor or other equivalent processing element switches the traffic from the failed link to a previously calculated protection route (or restoration route). In the case of MPLS based networks, the protection route comprises an LSP tunnel. For each link to be protected, a restoration route is calculate a priori (i.e. off line) and the appropriate nodes are configured in accordance with the restoration route.

The protection route may be calculated using any suitable search algorithm such as the well known Dijkstra routing algorithm, Breadth Search First (BSF) or Depth Search First (DFS), for example, or any other search algorithm capable of calculating a protection route based on the logical topology of the network. Note that the logical topology is the topology of the links in the network whereas the physical topology is the topology of the fibers in the network.

Note, however, that in many cases such as in WDM networks, for example, the physical topology of the network is not known and only the logical topology is known. The present invention has the advantage of not requiring knowledge of the physical topology of the network, as long as there is sufficient redundancy in the network. The mechanism of the invention avoids selecting protection routes comprising segments passing through the failed link itself thus insuring that the protection route for a logical link traversing a failed fiber does not pass through the failed fiber.

The invention achieves this by modifying the link level topology of the network used by the search algorithm. In accordance with the invention, the search for a protection route for any particular link is restricted to the set of logical links that use the same color as that of the link to be protected. Since the same color is not used twice in any one fiber, this guarantees that the protection route will not pass through the failed link.

Figure 3:
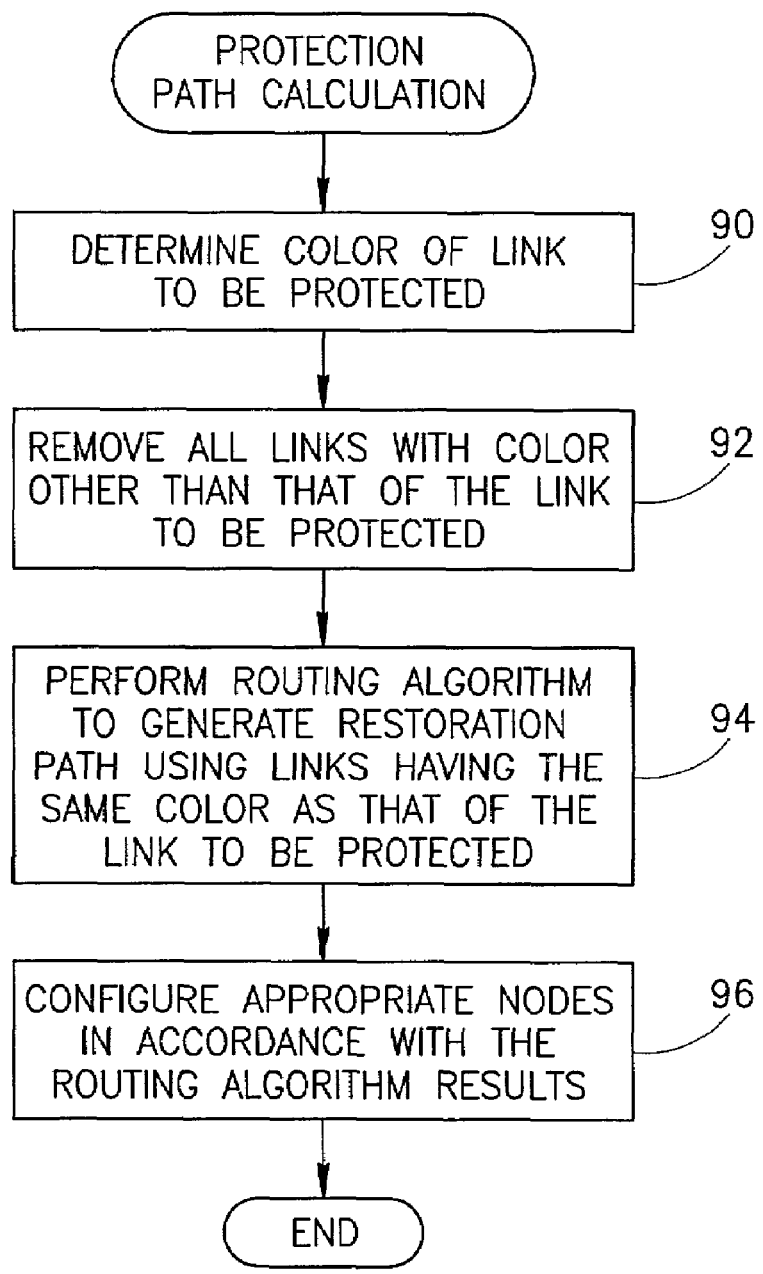
FIG. 3 is a flow diagram illustrating the method of the present invention for calculating protection paths.

A flow diagram illustrating the method of the present invention for calculating protection paths is shown in FIG. 3. It is assumed at this point that the network has sufficient redundancy built in for each color for purposes of establishing protection routes. A requirement of the mechanism of the invention is that the same color does not pass twice through the same fiber. This, in fact is implicit in WDM. In the second embodiment, the user assigns virtual colors to logical links such that the same color does not pass twice through the same fiber/bundle, as described in more detail infra.

The first step is to determine the color of the link to be protected (step 90). It is also assumed the logical topology of the network is known by the entity performing the search algorithm, e.g., the NMS, designated node or other equivalent entity. In general, details of the physical topology are not required by the invention. Its only use is by the network designer when building the network, in determining whether there is sufficient redundancy within each color for each of the required protection routes to be created, such that in the event of a single fiber failure, the protection paths of all failed links do not use the same bandwidth.

Next, all logical links having colors other than that of the link to be protected are temporarily removed from the topology for purposes of the route calculation so as to generate a single color logical topology (step 92). In addition, the link to be protected is also temporarily removed from the topology for purposes of the route calculation. The search algorithm is then executed to generate a restoration path that uses only logical links having the same color as that of the link to be protected (step 94). Once the route is successfully calculated, the appropriate nodes are configured appropriately (step 96).

When a link failure (i.e. fiber cut) occurs, the nodes on either end of the link(s) that were cut immediately switch the traffic via hardware to the precalculated and configured protection route.

Note that any suitable entity in the network may implement the mechanism of the present invention. Typically, the NMS is adapted to perform the invention but one or more individual nodes in the network may also be adapted to perform the invention. To perform the invention, the entity must have knowledge of the logical or color level topology of the network.

Figure 4:
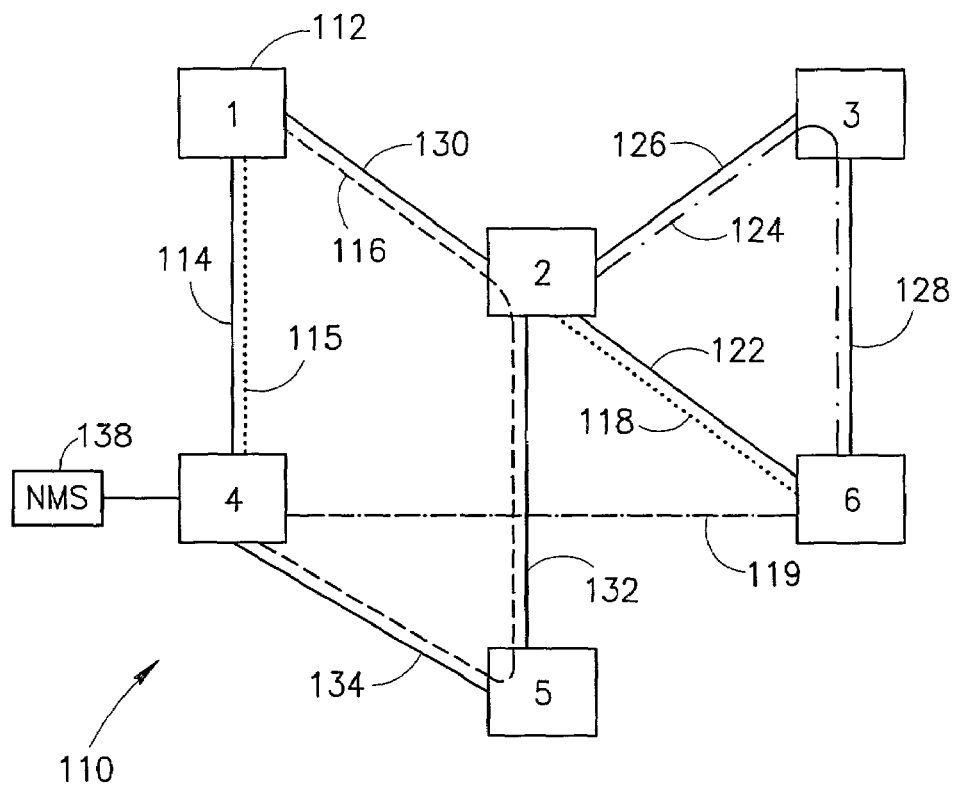
FIG. 4 is a network diagram illustrating an example restoration scenario in a mesh optical network employing wavelength division multiplexing in accordance with the present invention.

A network diagram illustrating an example restoration scenario in a mesh optical network employing wavelength division multiplexing in accordance with the present invention is shown in FIG. 4. The network, generally referenced 110, comprises a plurality of nodes 112, labeled 1 through 6 and Network Management System (NMS) 138. The nodes are connected to each other via links as indicated. Note that this example represents the logical links only, physical links are not indicated. The links have the following colors: links 114, 130, 132 and 134 are red; links 122, 126 and 128 are green, link 118 is yellow, link 115 is blue and link 119 is orange.

Using the route calculation mechanism of the present invention, several links have been calculated that can be used in protecting one or more links in the event of a fiber cut. Note that in this example, the logical links may span more then one physical link. Protection routes for links 114 and 122 have been calculated as follows. The mechanism of the invention calculates the protection path 116 (dashed line) for link 114 (color red) comprising red links 134, 132 and 116 linking nodes 1, 2, 5 and 4. The protection path 124 (dashed-dotted line) for link 122 (color green) comprising green links 126, 128 linking nodes 2, 3 and 6.

Note that in accordance with the invention, the blue link 115 is eliminated from use in the protection path for link 114 even though it connects nodes 1 and 4, since it is not the same color as the link 114. Similarly, the yellow link 118 is eliminated from use in the protection path for link 122 even though it connects nodes 2 and 6. In both cases, the orange link 119 is eliminated as well.

Second Embodiment-Assignment of Virtual Colors

Figure 5:
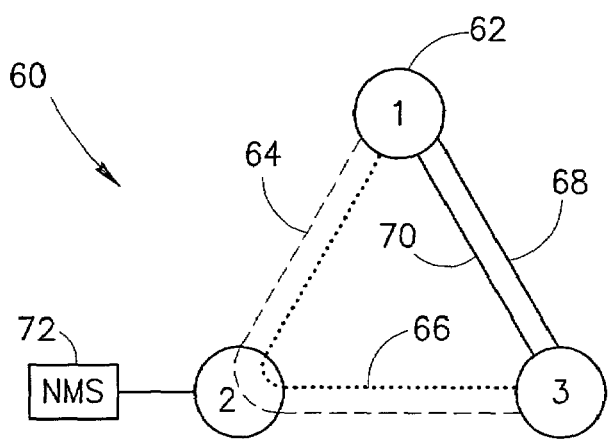
FIG. 5 is a network diagram illustrating an example optical network including WDM segments and non-WDM segments.

In the second embodiment of the invention, virtual colors are assigned in order to handle the case where the network does not have sufficient redundancy for protection paths or in the case where fiber bundles are used. A network diagram illustrating an example optical network including WDM segments and non-WDM segments is shown in FIG. 5.

In the example shown, generally referenced 60, nodes 62 are connected by WDM and non-WDM links. Each node comprises an Optical Add Drop Multiplexer (OADM) adapted to add and drop zero or more colors or to pass zero or more colors through without adding or dropping them. A NMS 72 is connected to the network and implements the mechanism of the present invention. Logical link 64 (dashed line) and logical link 66 (dotted line) are WDM links connecting nodes 1 and 3. Two fibers 68, 70 connect nodes 2 and 3 that are not WDM links, thus they each run a single color.

Initially, in this example network, links 64 and 66 do not have a protection path. In accordance with the present invention, links 68 and 70 are assigned virtual colors corresponding to the colors used on links 64, 66. This enables links 68, 70 to be used in calculating a protection path for links 64, 66. In particular, link 68 is assigned a virtual color equal to the color of link 64. Similarly, link 70 is assigned a virtual color equal to the color of link 66. After assignment of the virtual colors, links 68, 70 can now function as protection links for links 64, 66, respectively. The route calculation mechanism of the present invention can now be executed to calculate the protection routes. Note that assignments of virtual color can be performed either manually or by automatic means such as by suitably programmed computing means.

Figure 6:
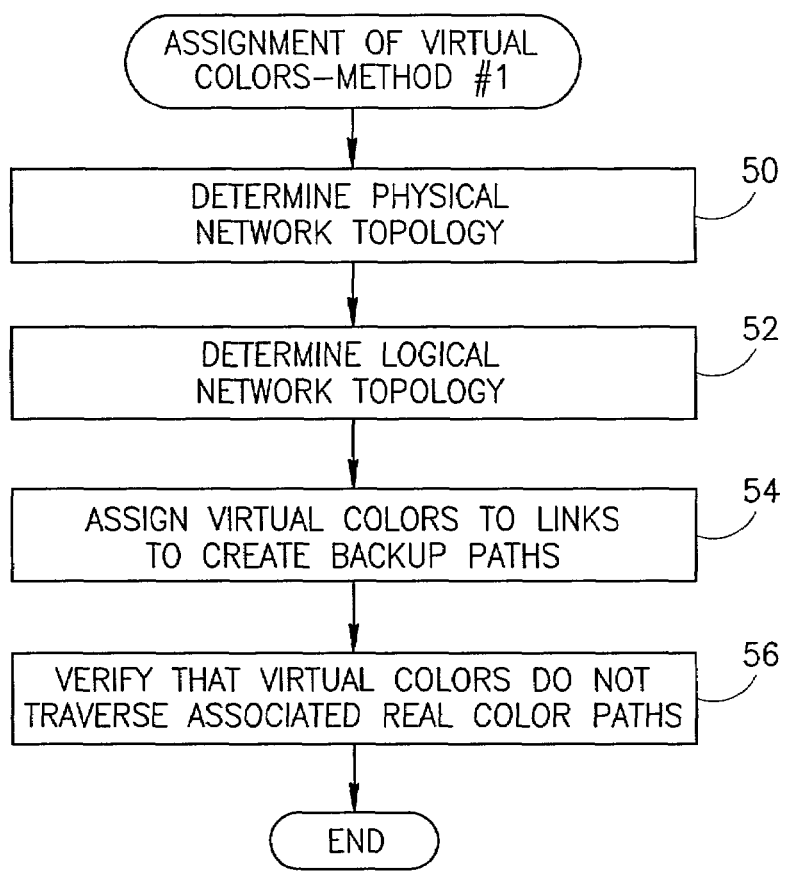
FIG. 6 is a flow diagram illustrating the method of assigning virtual colors in networks without sufficient redundancy.

A flow diagram illustrating the method of assigning virtual colors in networks without sufficient redundancy within each color is shown in FIG. 6. In order to assign virtual colors to one or more links in the network, the physical network topology must be known to the operator (step 50) and the logical topology must be known to the operator (step 52). As described supra, the physical topology is not needed by the invention. The user assigns logical colors to logical-links such that the same color does not pass twice through the same fiber and such that there is enough redundancy within each color to calculate the protection path (step 54). It is then verified that the virtual colors assigned do not traverse any existing same colored paths (step 56).

After virtual colors are assigned in the network, there should be sufficient redundancy for protection routes, assuming the network operator properly assigned virtual colors. For each link to be protected, the route calculation mechanism of FIG. 3 is executed to determine a protection route. Thus, the assignment of virtual colors to links enable the links to be included in the execution of the search algorithm for finding protection paths that do not traverse the protected link.

Figure 7:
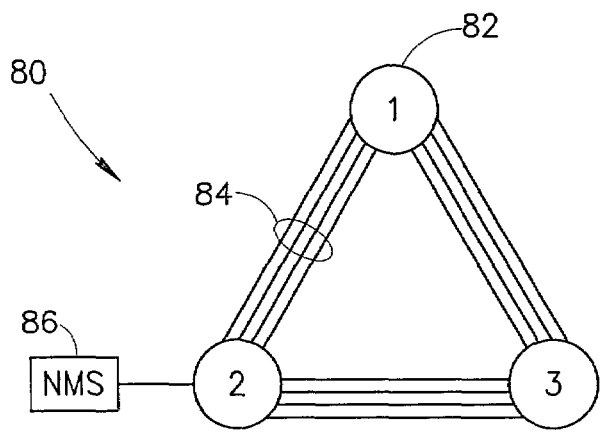
FIG. 7 is a network diagram illustrating an example optical network incorporating links comprised of optical fiber bundles.

The assignment of virtual colors is also applicable in optical networks employing WDM techniques wherein the nodes are connected by bundles of fibers. A network diagram illustrating an example optical network incorporating links comprised of optical fiber bundles is shown in FIG. 7. The example network shown here, generally referenced 80, comprises three nodes 82 connected to each other by optical fiber bundles 84 and an NMS 86 adapted to implement the mechanism of the present invention. Each node comprises an Optical Add Drop Multiplexer (OADM) adapted to add and drop zero or more colors or to pass zero or more colors through without adding or dropping them.

In this case, each fiber within the bundle of fibers comprises several colors and the network is to be protected from fiber cuts that sever an entire bundle of fibers. Thus, the protection routes for the links on one fiber in the bundle cannot use a link that passes through other fibers in the bundle. In order to prevent the search algorithm from using colors within other fibers in the bundle, the bundle must not include more than one instance of each color. Thus, in accordance with the invention, virtual colors are assigned to the fibers such that the same color (virtual or real) does not pass twice through any of the fibers in the bundle. In operation, the first fiber can retain the real colors while the remaining fibers are assigned virtual colors.

Figure 8:
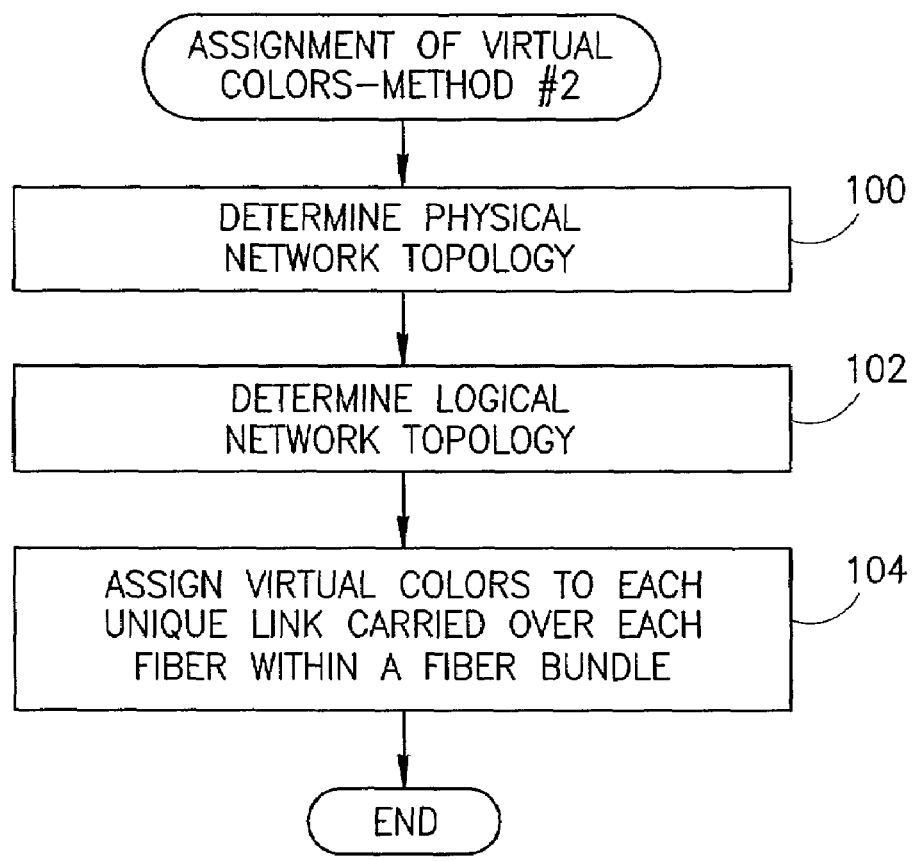
FIG. 8 is a flow diagram illustrating the method of assigning virtual colors to bundles of fibers.
Figure 9:
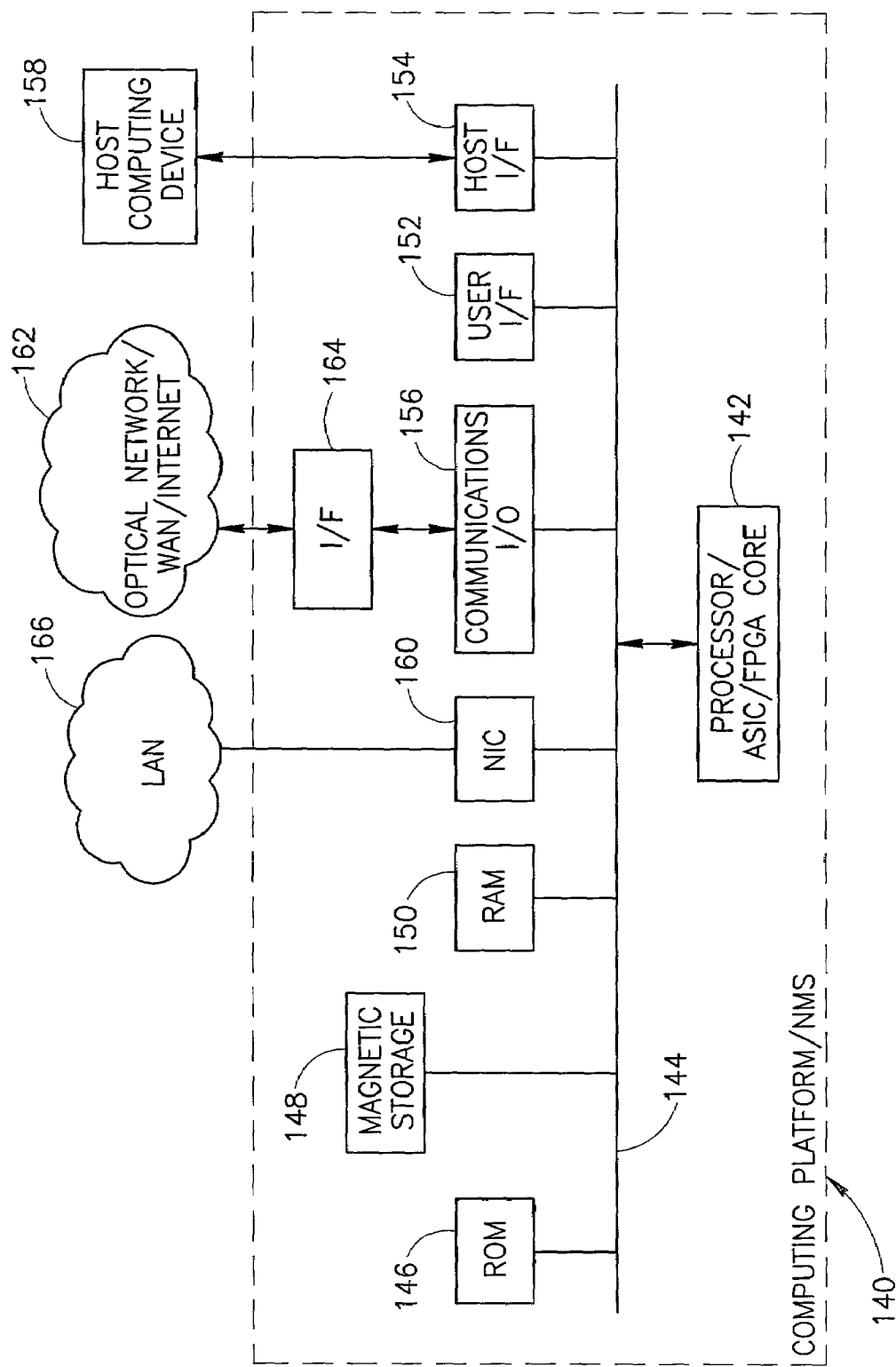
FIG. 9 is a block diagram illustrating an example computer processing system adapted to perform the link level network protection route calculation mechanism of the present invention.

A flow diagram illustrating the method of assigning virtual colors to bundles of fibers is shown in FIG. 8. In order to assign virtual colors to links in the network, the location of the fiber bundles must be known (step 50) and the logical topology must be known (step 52). As described supra, the physical topology is not needed by the invention. It is used for the manual color assignment process, in which the user assigns logical colors to logical-links such that the same color does not pass twice through the same fiber bundle (step 54), such that sufficient redundancy exists within each color so that protection paths can be found for each link using only links of the same color.

In this example, virtual colors are assigned to the four fibers in each fiber bundle. Rings are formed using logical links of the same virtual color. When the search algorithm is executed, all colors other than the one in the link being protected are removed thus preventing the possibility that the protection route will include a link traversing the failed link.

It is important to point out the assignment of virtual colors is done on a per link basis and not a per color basis. In other words, virtual colors are assigned to logical links and not to WDM colors.

Use of Route Calculation Mechanism with MPLS Restoration

The route calculation mechanism of the present invention functions to calculate protection routes for logical links in the network. As an example, the invention may be used with a protection switching mechanism to provide a link protection in a network. A protection switching mechanism such as MPLS is performed at the link level. This implies that for each logical link failure the affected entities are the nodes that have a line interface (PHY) connected to that logical link. A portion of the traffic that went on the failed link starts using the protection path. In this example application, an MPLS multi-layered stack is used to aggregate several connections inside an LSP tunnel over the new path.

In order to protect a specific link, an LSP tunnel is setup, which is actually another LSP from the ingress node to the link to the egress node that does not go through the link itself. When an ingress node detects that its link has failed, it forwards all the protected traffic destined to that link to the previously calculated and configured protected LSP tunnel. However, instead of replacing each LSP label with the protection tunnel, the protection tunnel label is pushed in addition to the original swapped label. When the traffic reaches the other end of the LSP tunnel, the LSP tunnel label is popped, and the inner label is used to forward the data further. This enables one LSP tunnel to be used for several LSPs, while still allowing them to be differentiated behind the LSP tunnel.

Note that unlike SONET, which assumes that the nodes themselves are fail-safe through internal hardware and software redundancy, wherein only the links can fail, MPLS can provide protection for both link and node failures.

NMS/Computer Embodiment

In another embodiment of the invention, a computer is operative to execute software adapted to perform the link level network protection path calculation mechanism of the present invention or any portion thereof. The system may be incorporated within a network device such as a Network Management System, network node, etc. or any other wired or wireless network device. The device may be constructed using any combination of hardware and/or software.

A block diagram illustrating an example computer processing system adapted to perform the link level network protection path calculation mechanism of the present invention is shown in FIG. 8. The computer system/NMS, generally referenced 140, comprises a processor 142 which may be implemented as a microcontroller, microprocessor, microcomputer, ASIC core, FPGA core, central processing unit (CPU) or digital signal processor (DSP). The system further comprises static read only memory (ROM) 146 and dynamic main memory (e.g., RAM) 150 all in communication with the processor. The processor is also in communication, via a bus 144, with a number of peripheral devices that are also included in the computer system.

The device is connected to an optical network 162 that may comprise in the alternative, a WAN such as the Internet via a suitable interface 164. Alternatively, the network may comprise an Optical Ethernet based MAN or other type of MAN depending on the location. The interface comprises wired and/or wireless interfaces to one or more WAN communication channels. Communications I/O processing 156 transfers data between the interface and the processor. The computer system is also connected to a LAN 166 via a Network Interface Card (NIC) 160 or other suitable interface adapted to handle the particular network protocol being used, e.g., one of the varieties of copper or optical Ethernet, Token Ring, etc. In operation, the computer system is operative to dynamically filter inbound packets from the WAN to the LAN and outbound packets from the LAN to the WAN as described supra.

An optional user interface 152 responds to user inputs and provides feedback and other status information. A host interface 154 connects a host computing device 158 to the system. The host is adapted to configure, control and maintain the operation of the system. The system also comprises magnetic storage device 148 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software operative to implement the functionality of the link level network protection path calculation mechanism of the present invention is adapted to reside on a computer readable medium, such as a magnetic disk within a disk drive unit or any other volatile or nonvolatile memory. Alternatively, the computer readable medium may comprise a floppy disk, Flash memory card, EPROM, EEROM, EEPROM based memory, bubble memory storage, ROM storage, etc. The software adapted to perform the link level network protection path calculation mechanism of the present invention or any portion thereof may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of determining a protection route in a network for links having a wave division multiplexing (WDM) color associated therewith, said method comprising the steps of:
   removing from consideration all logical links having a color other than that of the link to be protected to generate a single color logical topology;
   removing from consideration the link to be protected from the single color logical topology; and
   generating a restoration path for the link to be protected from said single color logical topology only.

2. The method according to claim 1, further comprising the step of configuring one or more nodes in said network in accordance with said restoration path.

3. The method according to claim 2, wherein said step of configuring comprises utilizing a signaling protocol chosen from the group comprising Reservation Protocol with Traffic Extensions (RSVP-TE) and Constraint based Label Distribution Protocol CR-LDP).

4. The method according to claim 2, wherein said step of configuring comprises utilizing a network-management protocol such as SNMP.

5. The method according to claim 1, wherein said links share a same optical fiber using WDM.

6. The method according to claim 1, wherein said links span more than a single fiber utilizing WDM means.

7. The method according to claim 1, wherein said logical topology comprises the topology of the links of the network.

8. The method according to claim 1, further comprising the step of assigning a virtual color to each link equal to its physical color.

9. The method according to claim 1, wherein generating said restoration path comprises executing a routing algorithm capable of generating a route based on said single color logical topology.

10. The method according to claim 9, wherein said routing algorithm is chosen from the group comprising Dijkstra, Breadth First Search (BFS) and Depth Search First (DFS).

11. The method according to claim 1, wherein said method is implemented in a Network Management System (NMS).

12. The method according to claim 1, wherein said method is implemented in nodes within said network.

13. The method according to claim 1, further comprising the step of switching traffic in the event of a link failure to a restoration path associated with said link failure.

14. A method of determining a protection route in a network, said method comprising the steps of:
   assigning a virtual color to logical links within said network;
   removing from consideration all logical links having a virtual color other than that of the link to be protected to generate a single color logical topology;
   removing from consideration the link to be protected from the single color logical topology; and
   generating a restoration path for the link to be protected from said single color logical topology only.

15. The method according to claim 14, further comprising the step of configuring one or more nodes in said network in accordance with said restoration path.

16. The method according to claim 15, wherein said step of configuring comprises utilizing a signaling protocol chosen from the group comprising Reservation Protocol with Traffic Extensions (RSVP-TE) and Constraint based Label Distribution Protocol CR-LDP).

17. The method according to claim 15, wherein said step of configuring comprises utilizing a network-management protocol such as SNMP.

18. The method according to claim 14, wherein said links share a same optical fiber using WDM.

19. The method according to claim 14, wherein said links span more than a single fiber utilizing WDM means.

20. The method according to claim 14, wherein said logical topology comprises the topology of the links of the network.

21. The method according to claim 14, wherein a default virtual color of each link is equal to its physical color.

22. The method according to claim 14, wherein generating said restoration path comprises executing a routing algorithm capable of generating a route based on said single color logical topology.

23. The method according to claim 22, wherein said routing algorithm is chosen from the group comprising Dijkstra, Breadth First Search (BFS) and Depth Search First (DFS).

24. The method according to claim 14, wherein said method is implemented in a Network Management System (NMS).

25. The method according to claim 14, wherein said method is implemented in nodes within said network.

26. The method according to claim 14, further comprising the step of switching traffic in the event of a link failure to a restoration path associated said link failure.

27. A method of determining a protection route in a network for links having a wave division multiplexing (WDM) color associated therewith, said method comprising the steps of:

assigning a virtual color to logical links within said network;

assigning virtual colors to links within a bundle of optical fibers such that the same virtual color does not appear more than once across all fibers within each bundle of optical fibers;

removing from consideration all logical links having a virtual color other than that of the link to be protected to generate a single color logical topology;

removing from consideration the link to be protected from the single color logical topology; and generating a restoration path for the link to be protected from said single color logical topology only.

28. The method according to claim 27, further comprising the step of configuring one or more nodes in said network in accordance with said restoration path.

29. The method according to claim 28, wherein said step of configuring comprises utilizing a signaling protocol chosen from the group comprising Reservation Protocol with Traffic Extensions (RSVP-TE) and Constraint based Label Distribution Protocol CR-LDP).

30. The method according to claim 28, wherein said step of configuring comprises utilizing a network-management protocol such as SNMP.

31. The method according to claim 27, wherein said links share a same optical fiber using WDM.

32. The method according to claim 27, wherein said links span more than a single fiber utilizing WDM means.

33. The method according to claim 27, wherein said logical topology comprises the topology of the links of the network.

34. The method according to claim 27, wherein a default virtual color of each link is equal to its physical color.

35. The method according to claim 27, wherein generating said restoration path comprises executing a routing algorithm capable of generating a route based on said single color logical topology.

36. The method according to claim 35, wherein said routing algorithm is chosen from the group comprising Dijkstra, Breadth First Search (BFS) and Depth Search First (DFS).

37. The method according to claim 27, wherein said method is implemented in a Network Management System (NMS).

38. The method according to claim 27, wherein said method is implemented in nodes within said network.

39. The method according to claim 27, further comprising the step of switching traffic in the event of a link failure to a restoration path associated said link failure.

40. A computer program product for use in a network device, said computer program product comprising:

a computer useable medium having computer readable program code means embodied in said medium for determining a protection route in a network for links having a wave division multiplexing (WDM) color associated therewith, said computer program product comprising:

computer readable program code means for removing from consideration all logical links having a color other than that of the link to be protected to generate a single color logical topology;

computer readable program code means for removing from consideration the link to be protected from the single color logical topology; and computer readable program code means for generating a restoration path for the link to be protected only from said single color logical topology.

41. The method according to claim 40, wherein said network device comprises a Network Management System (NMS).

42. The method according to claim 40, wherein said network device comprises a network node.

43. The method according to claim 40, further comprising the step of switching traffic to the restoration path associated said link failure in the event of a link failure.

* * * * *